United States Patent [19]
Kurihara et al.

[11] Patent Number: 5,701,855
[45] Date of Patent: Dec. 30, 1997

[54] CARTRIDGE FUEL INTERNAL COMBUSTION ENGINE

[75] Inventors: Katsumi Kurihara, Nagoya, Japan; Shiro Kawamoto, Chandler, Ariz.; John E. Nemazi, Bloomfield Hills; William G. Conger, Grosse Ile, both of Mich.

[73] Assignee: Ryobi Limited, Japan

[21] Appl. No.: 725,452

[22] Filed: Oct. 4, 1996

[51] Int. Cl.$^6$ ............................................ F02B 75/02
[52] U.S. Cl. ........................................ 123/73 AD; 123/527
[58] Field of Search ......................... 123/27 GE, 73 AD, 123/527

[56] References Cited

U.S. PATENT DOCUMENTS

| | | | |
|---|---|---|---|
| 4,632,067 | 12/1986 | Carlson | 123/25 B |
| 4,721,078 | 1/1988 | Watanabe et al. | 123/198 DB |
| 4,774,909 | 10/1988 | Dolderer | 123/527 |
| 4,864,991 | 9/1989 | Snyder et al. | 123/344 |
| 4,887,579 | 12/1989 | Fenton et al. | 123/525 |
| 4,894,067 | 1/1990 | Bayerstock | 123/527 |
| 4,924,822 | 5/1990 | Asai et al. | 123/27 GE |
| 4,928,390 | 5/1990 | Gassen et al. | 123/73 AD |
| 4,953,516 | 9/1990 | van der Weide et al. | 123/527 |
| 4,997,458 | 3/1991 | Jones | 123/527 |
| 5,121,609 | 6/1992 | Cieslukowski | 123/527 |
| 5,146,903 | 9/1992 | Baverstock | 123/527 |
| 5,163,409 | 11/1992 | Gustafson et al. | 123/527 |
| 5,251,602 | 10/1993 | Kurihara et al. | 123/527 |
| 5,330,031 | 7/1994 | Hill et al. | 180/271 |
| 5,370,098 | 12/1994 | Iida | 123/306 |
| 5,499,615 | 3/1996 | Lawrence et al. | 123/527 |
| 5,579,735 | 12/1996 | Todero et al. | 123/317 |

*Primary Examiner*—David A. Okonsky
*Attorney, Agent, or Firm*—Brooks & Kushman P.C.

[57] ABSTRACT

An internal combustion engine is provided with a cartridge containing a fuel/oil mixture where the fuel is liquid, normally gaseous fuel. The cartridges can be readily mounted or demounted from the engine, and provide flexibility of use coupled with easy starting. The use of the fuel/oil cartridges eliminates the need to separately mix oil and fuel, and eliminates substantial contact of the user with an oily fuel/oil mixture. The two cycle and four cycle cartridge-type engines are suitable for use in many hand-powered implements, including line trimmers, chain saws, leaf blowers, hedge trimmers, etc.

20 Claims, 4 Drawing Sheets

CARTRIDGE FUEL INTERNAL COMBUSTION ENGINE

TECHNICAL FIELD

The present invention pertains to internal combustion engines. More particularly, the subject invention pertains to two cycle and four cycle engines wherein a replaceable fuel cartridge containing a liquified, normally gaseous fuel and lubricating oil is employed to supply premixed fuel and oil to the engine.

BACKGROUND ART

The use of small two cycle engines has increased dramatically in the past decade, particularly for items such as chain saws, line trimmers, lawn vacuums and leaf blowers, and the like. Part of this increased use is due to the introduction of gasoline-powered products such as line trimmers and leaf blowers at the consumer level. A further part of the increase is due to improvements in two cycle engine design which have reduced cost, enable easier starting and require less maintenance.

However, despite the improvements in two cycle engine design alluded to above, many consumers prefer to purchase electrically-powered equipment, even though the latter requires a long, tangle-prone extension cord. Part of the reluctance to purchase gasoline-powered implements is due to the necessity of mixing oil with fuel in order to provide engine lubrication. Unlike four cycle engines where engine lubricant is separately contained in a crankcase and delivered to points requiring lubrication by an internal, engine-driven oil pump, in two cycle engines, lubrication is provided by incorporating oil into the fuel. The oil present tends to foul the spark plug, and in cold weather, this, in conjunction with the lessened evaporation rate of the fuel, renders two cycle engines sometimes hard to start.

The oil required for fuel supplied crankcase lubrication is a specialized product unlike ordinary lubricating oil. The ratio of fuel to oil may range from 8:1 to 100:1, but is generally in the range of 16:1 to 50:1. If the oil is not measured properly, the engine may prove difficult to start, or may be damaged by lack of lubricant. Each particular two cycle engine may require its own particular oil/fuel ratio. The necessity to purchase special two cycle oil, to measure the oil carefully, and to maintain various containers with different fuel/oil ratios are all factors which discourage use of such engines.

Four cycle engines are common on equipment such as lawn mowers, high pressure washers, and the like. The availability of separate intake and exhaust strokes generally results in lessened emissions from these engines, particularly as compared to simple two cycle engines where the opening and closing of intake and exhaust ports is performed by movement of the piston crown alone and not by rotary valves and the like. However, it is difficult to use four cycle engines in devices such as hedge trimmers, chain saws, line trimmers, and the like because these and other types of equipment must be operated at many angles, occasionally even upside down. Under these conditions, severe frothing of crankcase oil can occur. Thus, use of four cycle engines on such equipment has not materialized.

It would be desirable to provide a two cycle engine which does not require the mixing of oil and fuel; which avoids hard starting or engine damage due to improper oil/fuel measurement; which is easily startable in cold weather, and which avoids the necessity of maintaining separate containers of gasoline having varying fuel/oil ratios. It would be further desirable to provide a four cycle engine which does not employ an oil-containing crankcase and which is capable of operation at many angles.

SUMMARY OF THE INVENTION

The present invention pertains to an internal combustion engine wherein the fuel for such engine is a combustible gas supplied in compressed, liquified form in a cartridge, the liquified gas further containing an amount of dissolved lubricant sufficient to lubricate the working parts of the engine. The fuel/lubricant cartridges may be discarded after use or may be refilled.

DETAILED DESCRIPTION OF THE INVENTION

Figure 1:
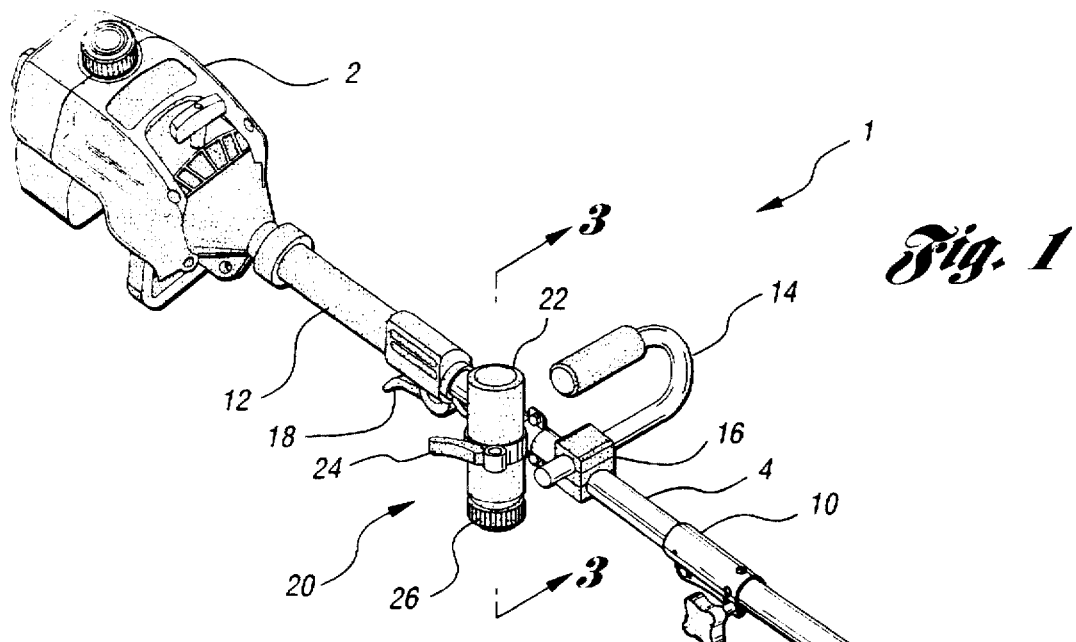
FIG. 1 illustrates a line trimmer driven by a two cycle engine of the subject invention.

The two cycle engines of the present invention are of conventional construction with the exception of the fuel system. The engine per se is the type of two cycle engine wherein the fuel/oil mixture is drawn in whole or in part through the crankcase in order to provide a lubricating oil film on the internal moving parts, prior to the time where the fuel/oil mixture is introduced into the combustion chamber. The intake of the engine may be of the fixed port type, sleeve-type, disc-type, reed-type, or other type suitable for modern high performance two cycle engines.

The four cycle engines of the subject invention are of similar construction to conventional four cycle engines with several additional requirements. While the exhaust system is entirely conventional, the exhaust valve communicating with an exhaust passageway and/or manifold, generally connected to a muffler, the intake system is different. In the intake system of the four stroke engines of the present invention, at least one intake valve in the cylinder head communicates directly or indirectly with the engine crankcase. Moreover, unlike some engine designs wherein the crankcase is vented, in the present four stroke engines, the crankcase is substantially sealed. During the upward strokes of the piston, fuel/oil mixture from the fuel cartridge and air are drawn into the crankcase, either directly through a fuel/oil regulator and/or carburetor, or indirectly through the valve chamber, etc. The admission valve may be a reed valve or rotary valve which remains closed on the ignition stroke of the engine. At this time, the intake valve is also closed, and thus the fuel/oil/air mixture in the closed crankcase is merely compressed upon the downward stroke and decompressed on the upward stroke. There is little if any loss in power during these "non-transfer" strokes as any loss due to the piston descending against the pressure in the crankcase is compensated by this same pressure acting on the ascending piston on the return stroke. On the intake stroke, the intake valve opens and fuel/oil/air flows from the crankcase into the combustion chamber through a passageway which provides communication from the crankcase to the intake valves. On the upward, compression stroke, the lowered pressure in the crankcase again draws fuel/oil/air through the carburetor into the crankcase. As there is no sump and no excess oil, frothing of the oil is eliminated, and the engine may be operated in essentially any position.

In the cartridge fuel engine of the subject invention, a liquified gaseous fuel and oil mixture is stored under pressure in a pressure vessel tank. As the liquid fuel is normally a gas at engine operating temperatures, the fuel rapidly flash evaporates upon begin metered into the engine, nebulizing the oil contained in the fuel, as the ambient temperatures are well above the fuel boiling point. Thus, restrictions of flow, for example those of a venturi necessary to reduce air pressure, are not required. As a result, air flow to the engine is more efficient, and higher specific outputs may be obtained from the same engine size. The carburetor does not require a float bowl or its equivalent, as there is no need to maintain a supply of liquid at a given height in a fuel chamber.

In an alternative embodiment of the subject invention, a liquid fuel/oil mixture does not reach the carburetor, to be metered into the air stream by a needle valve, but rather the oil and fuel are chosen carefully so as to create an azeotrope-like composition, the takeoff from the cartridge being positioned such that a gaseous fuel/oil mixture is delivered to the engine. In this case, the metering valve may be of substantially larger size than in the former case, as a somewhat larger volume of gaseous fuel must be controlled, rather than a smaller volume of liquid fuel.

The cartridge of the cartridge-type engine will be similar in construction to those of the type used in portable propane torches and the like, wherein the torch is screwed onto or into a nipple or recess, respectively, in the top of the cylinder, communication with the interior of the cylinder being provided only when the threading engagement of the cylinder has progressed to the point where little if any leakage past the not-yet seated sealing engagement will take place. When engines having different fuel/oil requirements are desired, it is most desirable that each different fuel/oil ratio cartridge have a different diameter thread, or a different (left or right) threaded pitch, so as to prevent the inadvertent coupling of a cartridge designed for one fuel/oil ratio with an engine designed for another fuel/oil ratio.

The cartridges may be designed for operation with the nipple end of the tank lowermost or uppermost. Further the tank is designed to supply either liquid or gas, depending upon the nature of operation of the particular engine and carburetor. For example, in the case of a vertically mounted tank with a lowermost nipple connection, where the engine is designed to operate on a gaseous fuel/oil azeotrope, the connection at the nipple end of the tank will include a hollow tube or its equivalent which extends into the head space of the tank located most remotely from the nipple. Such tanks are advantageously filled only from ½ to ⅔ of their total capacity with liquid pressurized fuel/oil. The head space, being filled with the gas/oil azeotrope, delivers this gaseous mixture under pressure to the engine carburetor, and is rapidly replaced by evaporation from the pressurized fuel/oil mixture contained in the tank.

In the case where engine operation is desired to be from a liquid fuel/oil mixture, the tube, which may be termed a siphon tube, is eliminated from the fuel cartridge, liquid fuel/oil exiting directly at the nipple. As the liquified fuel/oil leaves the cylinder, the pressure in the head space above the liquid fuel/oil is reduced, and more fuel evaporates, providing the necessary pressure to maintain fuel delivery.

The fuel contained in the cartridge may be selected with the operating environment in mind, but is preferably a liquified petroleum product which is a gas at ordinary pressure and expected ambient use temperatures. Thus, the fuel may be propane, butane, isobutane, or mixtures of these, also including minor quantities of acetylene, methane, ethane, various pentanes and hexanes including cyclopentane and cyclohexane, various low molecular weight ethers and ketones, for example methylethylketone,dimethylether, diethylether, methylethylether, di-n-propyether, and the like. The fuel components are chosen such that they virtually completely evaporate upon exhaustion of the cylinder, without significantly altering the fuel composition during the process of fuel delivery and/or evaporation. In other words, the fuel composition is selected so that the ingredients first supplied to the engine are substantially the same as those supplied to the engine near to the time where the fuel cartridge is exhausted. A simple test may be used to determine whether a given fuel mixture is suitable. First, a practical test is to simply run an engine on a filled cylinder of the desired fuel/oil mixture. If the engine runs suitably under the desired operating conditions from the onset of attachment of the fuel cartridge to the exhaustion of the fuel cartridge, and if the fuel cartridge at the end of the run has little if any fuel left in it, then the fuel mixture is satisfactory. Provided that the fuel cartridges are designed not to be reused, a fuel cartridge holding, e.g. 400 cm$^3$ of liquid fuel, will be satisfactory if the engine continues normal operation until exhaustion of the fuel from the cylinder, and the cylinder contains only several millimeters or less of liquid.

Preferably, however, the fuel mixture evaporates substantially uniformly, and the fuel composition does not change during the operation of the engine to any significant degree from the onset of cartridge connection to exhaustion. Fuels of this nature may be tested simply by connecting a cartridge with the fuel to be tested to a valve, and allowing fuel to flow from the valve into a suitable means of disposing of the fuel, with samples of vapor taken at intervals and subjected to chromatographic analysis. Chromatographic analysis is rapid, and will determine quantitatively the proportions of each component in the fuel which exits from the cylinder. The proportions of the various components can be compared from the beginning of cylinder use through exhaustion, to see whether the fuel component ratios have changed appreciably.

The lubricating oil is selected with regard to the particular type of cartridge, and fuel used therein. For cartridges which are designed to provide a pressurized liquid fuel/oil stream to the engine carburetor, all that is generally required of the lubricant is that it be soluble in the liquid fuel. Thus, ordinary two cycle lubricating oils are suitable for these purposes. If the oil should prove not soluble enough to provide the requisite amount of lubrication in a particular fuel mixture, the oil solubilizing power of the fuel may be enhanced through the addition of certain more powerful but burnable solvents, such as the various low molecular weight, low boiling ethers, ketones, and esters.

Suitable typical lubricating oil compositions, for example, may contain 21.3% paraffinic oils, 78.6% naphthenic oils, and 21.3% aromatic oils. A synthetic oil may replace one or more of the above components, even all of the components, with synthetic lubricants such as polyol fatty acid esters, alkylbenzenes such as dodecylbenzene and the various naphthenic oils; and polyolefins such as polybutene, Desene, and in general, oligomeric polymerized α-olefins. The latter are particularly useful in lowering the propensity of fuel/oil engines to generate smoke.

When the engine/cartridge combination is designed to use fuel/oil delivered to the carburetor in the vapor state, the requirements of the lubricating oil and fuel are more critical. In general, the fuel/oil mixture must be "azeotrope-like." By "azeotrope-like" is meant that under ordinary conditions, for example those expected to be routinely encountered during engine use, evaporation of the fuel/oil mixture will provide a vapor with approximately the same fuel/oil composition as that of the liquid from which the vapor has been created. In the case of cartridges which are designed to be reused, it is important that the azeotrope be very similar in composition to that of the liquid, as otherwise, non-evaporating, higher boiling components will accumulate in the cylinders as they are continually recharged. However, for cylinders which are not reusable, i.e., are designed for single use only, it is possible to incorporate a larger quantity of lubricant into the fuel oil mixture to assure that the vapor produced by evaporation contains enough of the oil to provide the requisite amount of lubrication. In such case, it is possible that several millimeters, up to 10-15 millimeters in a 400 millimeter tank, for example, remain after the fuel in the has been exhausted.

A simple test may be used to determine the suitability of fuel/oil compositions of cartridges designed to provide vaporous fuel/oil mixtures. In this test, the gaseous fuel/oil mixture from a cartridge is directed into a trap filled with a solvent for the fuel and oil mixture, or a cold trap. After a few minutes of passing vaporous fuel/oil mixture through the trap, the liquid in the trap is analyzed by high pressure liquid chromatography (HPLC) or gas chromatography (GC). The trap is then filled with fresh liquid, or a new cold trap installed and following further evaporation of gas/oil from the tank, a later sample of vaporous fuel/oil is directed into the freshly charged trap. The contents of this trap are then analyzed as well. A comparison of the relative amounts of lubricant and fuel components can be readily made. Preferably, the relative proportions of these ingredients do not change appreciably over the course of the evaporation. It is most preferable that the azeotrope-like condition of the fuel/oil mixture be such that at the pressure obtained within the cartridge, the azeotrope is substantially maintained, however, at the lower pressure which is obtained in the carburetor and crankcase, the azeotrope breaks down, resulting in a nebulized stream of oil droplets in vaporous fuel.

While it is desirable that the fuel/oil mixture be selected so as to be uniform, requiring only one type of cartridge connection, and one type of fuel cartridge for each engine, it is possible to supply cartridges which are tailored for the particular climatic use expected. For example, for engines which are designed to be used in cold environments, it is possible to supply a cylinder having a higher proportion of low boiling components, the color of the cylinder being coded by painting it blue, for example, indicating that it is for use in cold climates. For use in hot climates where the temperatures are commonly above 80° F., cylinders which are encoded with a red color may be used to signify operation under higher than normal ambient conditions, whereas a cylinder of neutral color or some other color combination may be supplied for ordinary temperatures, for example those within the range of 30° to 80° F.

A further desirable feature of the subject invention cartridge engines is that cartridges of various sizes may be supplied. Where maximum mobility is desired, or where only limited periods of use are envisioned, relatively small cylinders may be provided, whereas for longer more extended periods of use, cylinders of greater capacity may be provided. For cases where essentially stationary use is to be made, for example with a chain saw operating near a source of sawable lumber, fuel may even be supplied in large 20 pound tanks, connected to the engine through a supply hose having at its terminus the same type of connection as the cartridge.

Carburetors, regulators, and engine controls suitable for use in the subject invention may be readily selected by one skilled in the art. Reference may be had, for example, to U.S. Pat. Nos. 4,721,078; 4,864,991; 4,887,579; 4,894,067; 4,953,516; 4,997,458; 5,146,903; 5,251,602; 5,330,031; and 5,370,098, which are herein incorporated by reference.

With respect to the drawings, FIG. 1 illustrates a power tool 1 driven by a power head containing a two cycle engine of the subject invention. The power tool of FIG. 1 contains two cycle engine 2 attached to engine boom 4. This boom in some designs, i.e. that shown, may be used to drive different implements. In this case, the driven implement is a line trimmer implement 6 having line trimmer head 8, and being attached to engine boom 4 by means of boom coupling 10. At 12 is a generally cushioned rear handle, while at 14 is a front handle whose position is adjustable via clamp 16. Throttle trigger 18 regulates the speed of the two cycle engine. At location 20 is shown a fuel cartridge 22 of the subject invention, mounted via clamp 24 to engine boom 4, mating with a connector 26 as more fully described hereafter. Alternative locations for the fuel cartridge, e.g. attached to the engine itself, are also useful. In practice, a location which provides for suitable balance of the power tool 1 is generally chosen.

Figure 2:
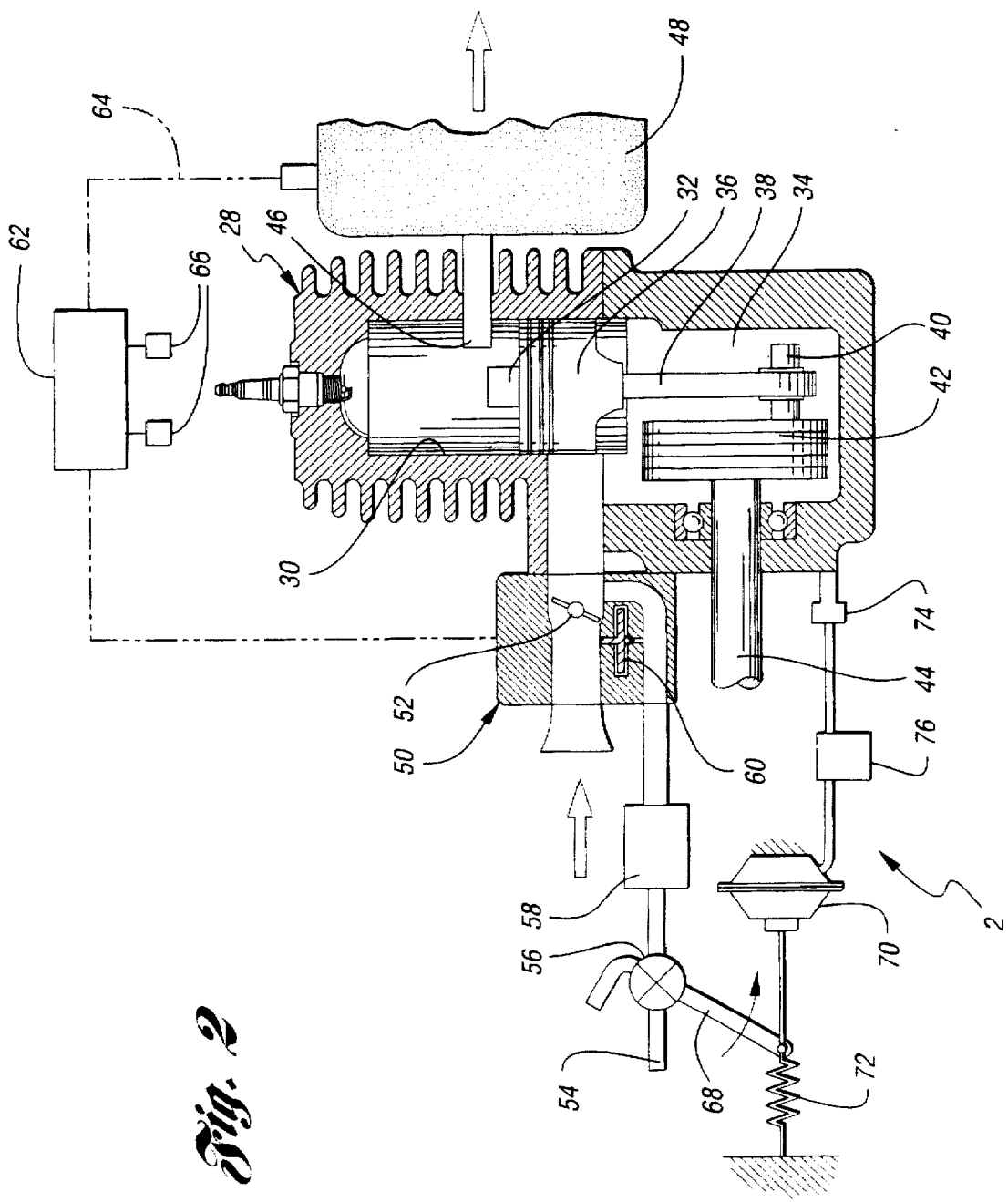
FIG. 2 illustrates one embodiment of a two cycle engine of the subject invention.

FIG. 2 illustrates one embodiment of a two cycle engine 2 suitable for use in the present invention. The two cycle engine 2 comprises a cylinder assembly 28 in the cylinder wall 30 of which is located an opening 32 which serves as a transfer port for entry of combustible fuel/oil mixture from closed crankcase 34. Piston 36 is articulated by connecting rod 38 to crankpin 40 attached to crankshaft 42. Engine power is delivered to the power tool shaft located within the engine boom by crankshaft output 44. Cylinder wall 30 is also pierced for an exhaust passage or port 46 which directs exhaust gas to muffler 48.

A combustible fuel/oil mixture is supplied initially to engine crankcase 34 through carburetor 50. The flow of air/fuel/oil mixture may be varied by butterfly valve 52 which is linked to the throttle trigger (18 in FIG. 1). Fuel/oil mixture is supplied from fuel cartridge 22 (FIG. 1) through line 54, through shut off valve 56, and through pressure regulator 58 to metering valve 60. Metering valve 60 may be linked to the throttle, may be controlled by engine vacuum or air flow, or may be controlled by electronic engine controller 62 having a control input 64 from the muffler and miscellaneous inputs 66, or by other means known to those skilled in the art of engine controls.

The shutoff valve 56 is linked via lever 68 to vacuum motor 70 on the one hand, and to return spring 72 on the other. Vacuum motor 70 communicates with the crankcase 34 through one way valve 74 and bleed valve 76, to hold the shutoff valve open during normal engine operation, but to close it by return spring 72 shortly following stopping of the engine.

Figure 3:
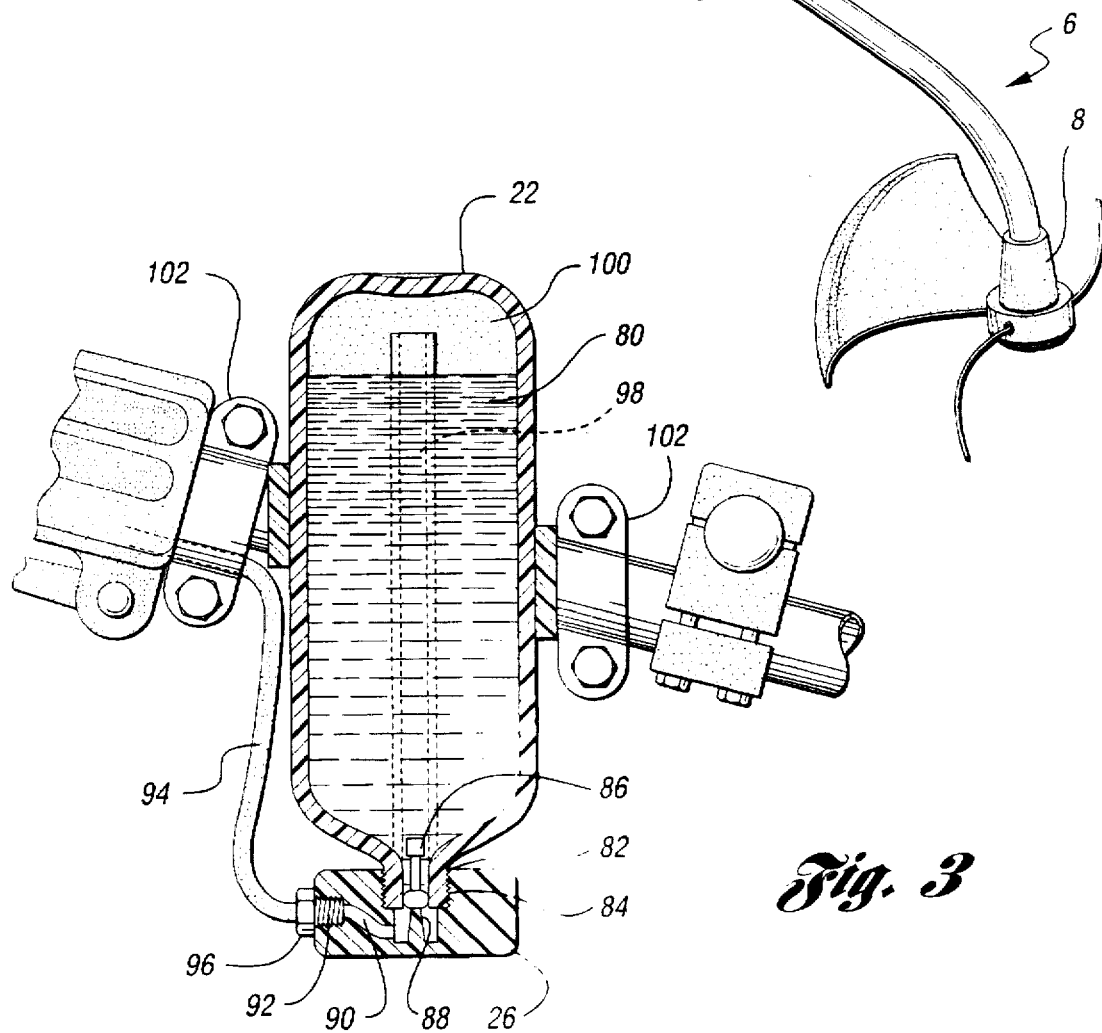
FIG. 3 illustrates one embodiment of a fuel/lubricant cartridge of the subject invention.

Details of one embodiment of a fuel cartridge may be had with reference to FIG. 3, a section across 3—3 of FIG. 1. In FIG. 3, fuel cartridge 22 is of metal or other construction, e.g. fiber reinforced composite or filament wound thermoplastic suitable for safely containing liquified fuel/oil 80 under pressure. The fuel cartridge has at one end a threaded nipple 82 which threadedly engages threaded recess 84 in connector 26. Nipple 82 has, preferably centrally located, a fill valve 86 which may be a Shrader-type valve or other type. When the fuel cartridge threads into connector 26, a protrusion 88 lifts the valve off its seat, allowing fuel/oil to flow through interior passage 90 to connector outlet 92. Connector 92 is attached to high pressure fuel/oil line 94 by connecting means 96, which may be a compression fitting, a swaged fitting, or other fluid connecting means. Shown at 98 in dotted lines is a siphon tube which extends to the head space 100 of the fuel cartridge. If operation on liquid fuel/oil is desired, i.e. a liquid fuel/oil mixture is supplied to the carburetor, then the siphon tube is dispensed with. Cylinder 22 is secured to engine boom 4 by suitable clamps secured to mounting brackets 102.

Figure 4:
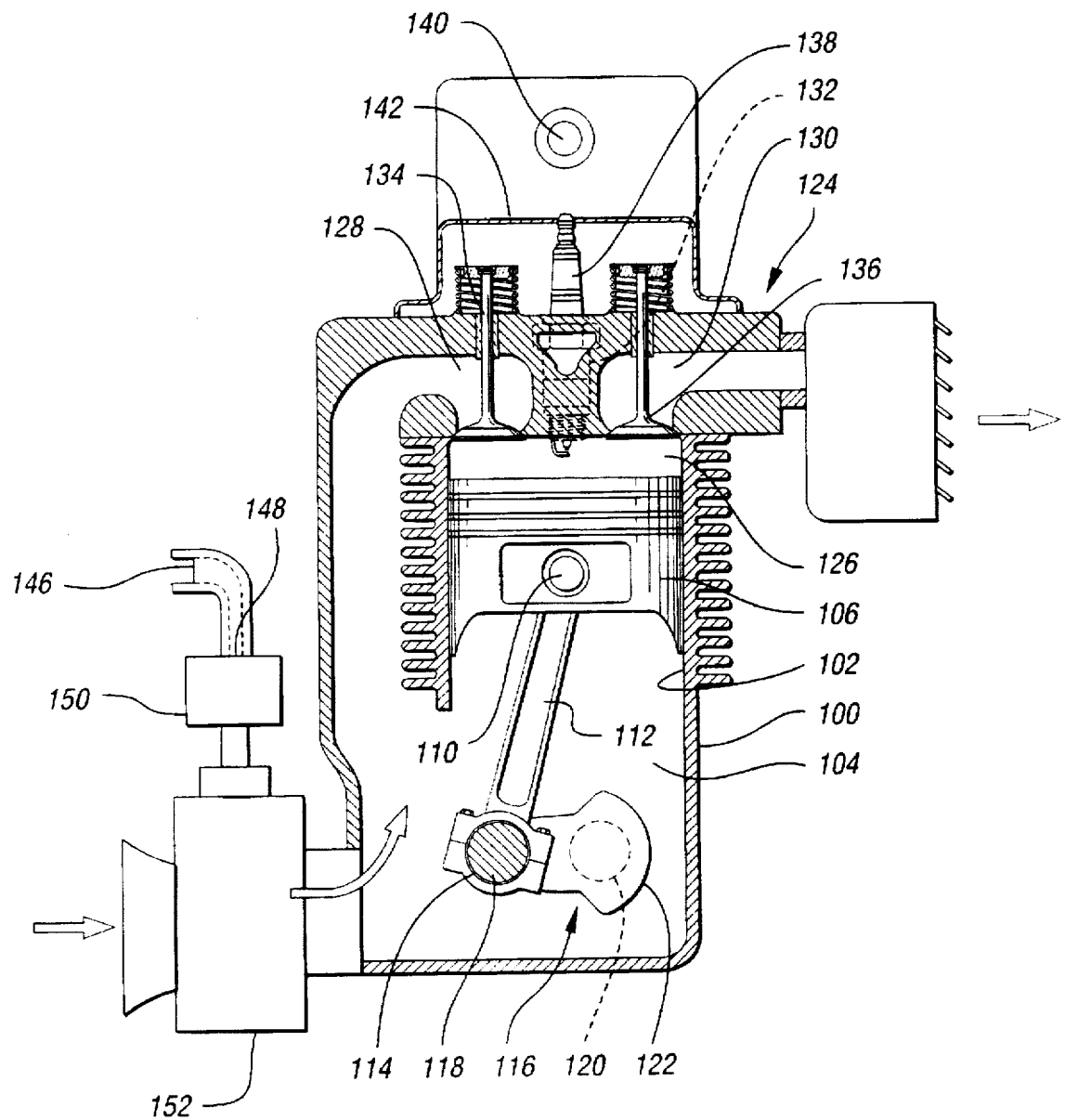
FIG. 4 illustrates one embodiment of a four cycle engine of the subject invention.

A four cycle engine assembly in accordance with one embodiment of the subject invention, as shown in FIG. 4, comprises an engine block 100 forming a cylindrical bore 102, an enclosed crankcase 104 in communication with the cylindrical bore, and a piston 106 reciprocally cooperating within a cylindrical bore. A connecting rod assembly has a first bearing 110 for pivotally cooperating with the piston, an elongated central region 112, and a second bearing 114 spaced from the first bearing. A crankshaft 116 has a crankpin 118 that cooperates with the connecting rod second bearing, an elongated axial shaft 120 that is pivotally mounted upon the engine block bearing journal and is provided with a drive end and an output end, and a web counterweight 122. A cylinder head assembly 124 is attached to the engine block to define a combustion chamber 126 in cooperation with the cylinder bore and the piston. The cylinder head assembly has an intake port 128 and an exhaust port 130. A spark plug hole 132 extends into the combustion chamber and the cylinder head further contains an intake valve 134, an exhaust valve 136 respectively cooperating with the intake and exhaust ports and spark plug. A cam shaft 140 is driven by the crankshaft at ½ engine speed for sequentially activating the intake and exhaust valves. Optionally, a valve cover 142 is attached to the cylinder head to define a valve chamber 144.

A connector 146 has an inlet for receiving a pressurized cartridge containing a mixture of liquid normally gaseous fuel and oil, and an outlet 148 for a fuel/oil mixture. A pressure regulator 150 cooperates with the connector outlet for providing a fuel/oil mixture at a controlled pressure. A carburetor 152 mixes the fuel/oil mixture with air at a predetermined ratio throughout a range of flow conditions associated with normal engine operation, as was shown in FIG. 2 for a two cycle engine.

Prior to introduction of fuel/oil mixture into the combustion chamber of the engine, the fuel/oil mixture supplied by the pressure regulator lubricates necessary portions of four cycle engine assemblies in crankcase 104 and valve chamber 144.

Figure 5:
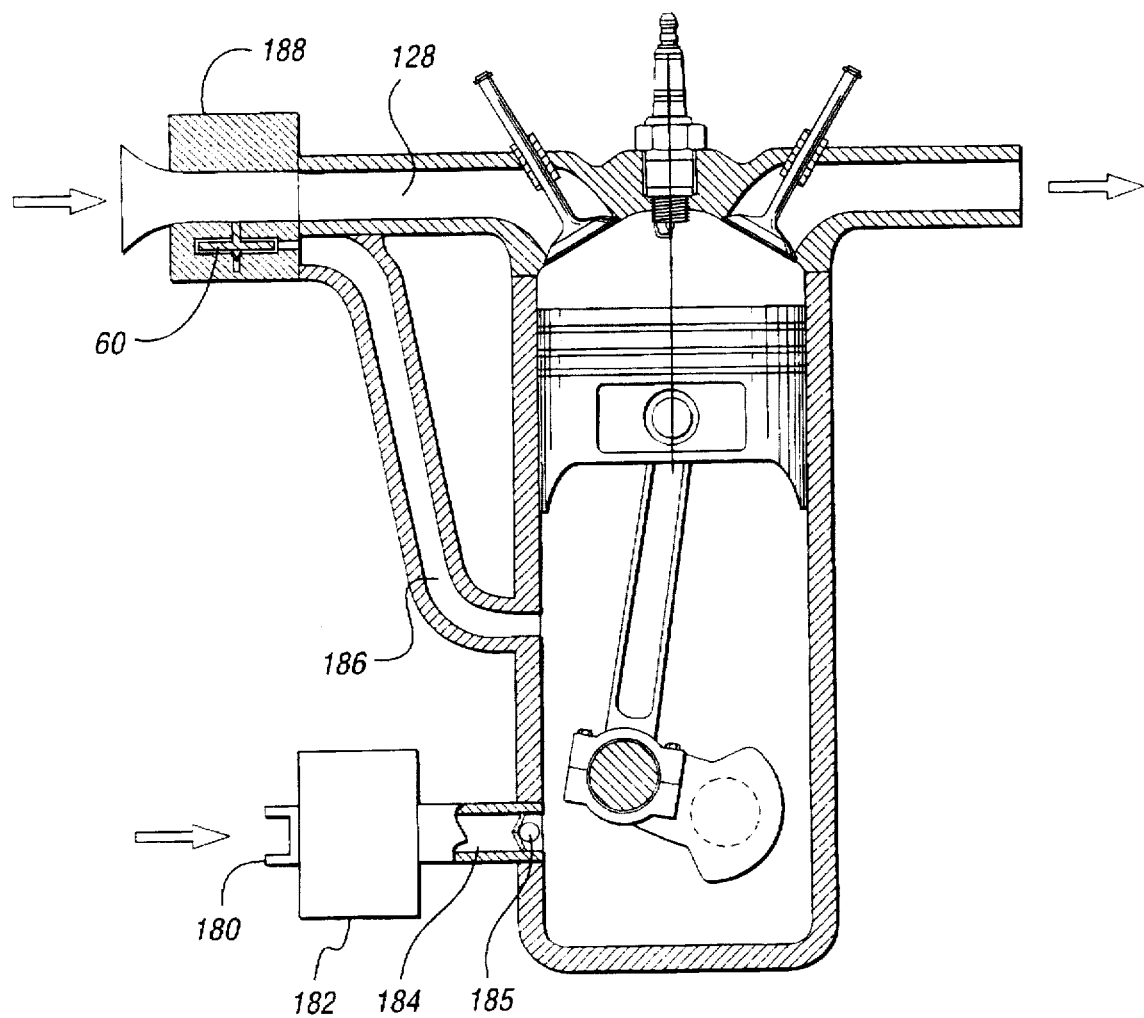
FIG. 5 illustrates the relevant portions of a further embodiment of a four cycle engine of the subject invention.

An alternative embodiment is shown in FIG. 5 wherein some of the detail of FIG. 4 has been omitted for clarity. For example, the valve springs and camshaft, etc. are not shown. In FIG. 5, the connector 180 is used to connect the fuel/oil cartridge to the engine, and communicates with pressure regulator 182. Passage 184 communicates with the crankcase 104 via check valve 185 and supplies regulated fuel/oil to the crankcase. Rather than flow through a passage into the intake port, the fuel/oil mixture flows through passage 186 to the carburetor 188 where it is regulated and mixed with intake air in a selected ratio by valve 60, then introduced into the combustion chamber through intake port 128.

Likewise, further embodiments may be envisioned which lie within the scope of the claimed invention. For example, the intake valves may be replaced by equivalent devices such as rotary valves, etc., the regulated fuel/oil input may be made to the valve cover instead of the crankcase, communicating with the latter by means of a suitable passageway. It is further possible to employ a plurality of intake valves, one communicating with the crankcase and/or valve cover and one communicating with the air inlet. It may be possible in such designs to utilize the pressure regulator to adjust the fuel/air ratio by varying the pressure of regulated fuel/oil rather than have the carburetor perform this function.

Having now fully described the invention, it will be apparent to one of ordinary skill in the art that many changes and modifications can be made thereto without departing from the spirit or scope of the invention as set forth herein.

What is claimed is:

1. A two-cycle engine assembly of the type having a crankcase through which combustible air/fuel/oil mixture flows prior to introduction into a combustion chamber of the engine, the two-cycle engine assembly comprising:

a crankcase assembly having a crankcase housing forming an enclosed crankcase chamber, the crankcase housing surrounding a crankshaft pivotally mounted thereto;

a piston and connecting rod;

a cylinder assembly affixed to the crankcase housing and having a cylinder wall and enclosed end to define a combustion chamber in cooperation with the piston, the piston sealingly cooperating with the cylinder wall and reciprocally movable thereby by the connecting rod which pivotally attaches the piston to the crankshaft causing the piston to reciprocate as the crankshaft rotates, the cylinder assembly having an inlet extending through the cylinder wall to introduce the air/fuel/oil mixture into the crankcase chamber and a transfer passageway connecting the crankcase chamber to the combustion chamber to allow air/fuel/oil mixture to be displaced from the crankcase chamber to the combustion chamber, the cylinder assembly further provided with an exhaust port extending through the cylinder wall to facilitate the removal of post-combustion exhaust gases;

a connector having an inlet for receiving a pressurized cartridge containing the mixture of liquid normally gaseous fuel and oil, and an outlet for the fuel/oil mixture;

a pressure regulator cooperating with the connector outlet for providing the fuel/oil mixture at a controlled pressure;

a carburetor coupled to the inlet of the cylinder assembly for mixing the fuel/oil mixture supplied by the pressure regulator with air at a predetermined ratio throughout a range of flow conditions associated with normal engine operation;

wherein the air/fuel/oil mixture lubricates necessary portions of the two cycle engine assembly prior to introduction into the combustion chamber of the engine.

2. The two cycle engine assembly of claim 1 further comprising an on/off valve interposed between the carburetor and the connector for positively preventing the flow of fuel/oil mixture from the connector to carburetor when the engine is not in use.

3. The two cycle engine assembly of claim 1 further comprising an automatic shut-off cooperating with the on/off valve and the engine to automatically close the on/off valve when the engine is not running.

4. The two cycle engine assembly of claim 3 wherein the automatic shut-off further comprises a spring biasing the on/off valve in a normally off position and a vacuum motor coupled to the crankcase chamber for urging the on/off valve to the open position when the engine is running.

5. The two cycle engine assembly of claim 1 wherein the connector orients the pressurized cartridge in a normally vertically extending orientation.

6. The two cycle engine assembly of claim 1 further comprising a structural member affixed the crankcase and the connector.

7. The two cycle engine assembly of claim 6 further comprising a clamp cooperating with the structural member for securely retaining the pressurized cartridge thereto.

8. The two cycle engine assembly of claim 1 wherein the fuel/oil mixture provided by the pressure regulator is in the gaseous state.

9. The two cycle engine assembly of claim 8 wherein the carburetor is provided with an internal diaphragm and needle valve for regulating the flow of fuel/oil mixture supplied by the pressure regulator.

10. The two cycle engine assembly of claim 1 further comprising an oxygen sensor positioned in the exhaust stream, a closed loop engine controller cooperating with the oxygen sensor and the carburetor to vary the flow of the fuel/oil mixture in response to the oxygen sensor output to maintain the air/fuel ratio at a desired level.

11. In combination, the two cycle engine assembly of claim 1 and a pressurized cartridge suitable for mounting to said connector, said cartridge containing the liquid normally gaseous fuel and lubricating oil dissolved therein.

12. The engine assembly and fuel cartridge combination of claim 11 wherein said liquid normally gaseous fuel and lubricating oil mixture is an azeo-trope-like mixture.

13. The engine assembly and fuel cartridge combination of claim 12 wherein said cartridge combination siphon tube in communication with gas in a head space above said mixture of liquid, normally gaseous fuel and oil.

14. A four cycle engine assembly, comprising:
an engine block forming a cylindrical bore, an enclosed crankcase in communication with the cylindrical bore;
a piston reciprocally cooperating within said cylindrical bore;
a connecting rod assembly having a first bearing for pivotally cooperating with the piston, an elongated central region, and a second bearing spaced from the first bearing;
a crankshaft having a crankpin cooperating with the connecting rod second bearing, an elongated axial shaft pivotally mounted upon the engine block bearing journal and provided with a drive end, an output end, and a web counterweight;
a cylinder head assembly attached to the engine block to define a combustion chamber in cooperation with the cylinder bore and the piston, said cylinder head assembly having an intake port and an exhaust port;
a spark plug hole extending into the combustion chamber and an intake valve;
an exhaust valve and a spark plug, respectively cooperating with the intake and exhaust ports and spark plug hole;
a cam shaft driven by the crankshaft at ½ engine speed for sequentially activating the intake and exhaust valves;
optionally, a valve cover attached to the cylinder head to define a valve chamber;
a connector having an inlet for receiving a pressurized cartridge containing a mixture of liquid normally gaseous fuel and oil, and an outlet for the fuel/oil mixture;
a pressure regulator cooperating with the connector outlet for providing the fuel/oil mixture at a controlled pressure;
a carburetor for mixing the fuel/oil mixture with air at a predetermined ratio throughout a range of flow conditions associated with normal engine operation;
wherein the fuel/oil mixture supplied by the pressure regulator lubricates necessary portions of four cycle engine assemblies prior to introduction into the combustion chamber of the engine.

15. The engine assembly of claim 14 wherein regulated fuel/oil is admitted to said crankcase from said regulator.

16. The engine assembly of claim 14 wherein regulated fuel/oil is admitted to said valve chamber from said regulator.

17. The engine assembly of claim 14 wherein a carburetor receives a regulated fuel/oil mixture and intake air, said carburetor communicating with said crankcase.

18. The engine assembly of claim 14 wherein a carburetor receives a regulated fuel/oil mixture and intake air, said carburetor directly communicating with said intake port.

19. The engine assembly of claim 14 wherein a carburetor receives a regulated fuel/oil mixture and intake air, said carburetor communicating with said valve chamber.

20. The engine of claim 14 wherein said carburetor is provided with a reed valve to prevent back flow of the fuel/oil mixture.

* * * * *